United States Patent
Perches

(10) Patent No.: US 8,683,736 B1
(45) Date of Patent: Apr. 1, 2014

(54) CASTING FLOAT WITH A SEPARATION MEMBER TO RETAIN THE CASTING FLOAT IN A PARTIALLY OPENED CONDITION, WHICH ALSO RETAINS A HOOK AND BAIT DURING CASTING AND WHICH FULLY OPENS WHEN THE CASTING FLOAT HITS A BODY OF WATER

(71) Applicant: Robert Perches, Encino, CA (US)

(72) Inventor: Robert Perches, Encino, CA (US)

( * ) Notice: Subject to any disclaimer, the term of this patent is extended or adjusted under 35 U.S.C. 154(b) by 0 days.

(21) Appl. No.: 13/888,243

(22) Filed: May 6, 2013

(51) Int. Cl.
*A01K 93/00* (2006.01)
(52) U.S. Cl.
USPC ............... 43/41.2; 43/43.11; 43/43.12
(58) Field of Classification Search
USPC ........... 43/41.2, 41, 43.11, 43.1, 44.87, 43.12
See application file for complete search history.

(56) References Cited

U.S. PATENT DOCUMENTS

| | | | | |
|---|---|---|---|---|
| 2,435,011 A | * | 1/1948 | Anders | 43/41.2 |
| 2,457,715 A | * | 12/1948 | Pazzano | 43/41.2 |
| 2,720,720 A | * | 10/1955 | Landrum | 43/43.11 |
| 2,740,224 A | * | 4/1956 | Heiderich | 43/41 |
| 2,914,883 A | * | 12/1959 | Kustusch | 43/41.2 |
| 3,084,468 A | * | 4/1963 | Christophel | 43/41.2 |
| 3,163,957 A | * | 1/1965 | Barrett | 43/41.2 |
| 3,178,847 A | * | 4/1965 | Mousseau | 43/41.2 |
| 3,190,028 A | * | 6/1965 | Mambrin | 43/41.2 |
| 3,230,659 A | * | 1/1966 | Colling | 43/43.11 |
| 3,611,613 A | * | 10/1971 | Perches | 43/41.2 |
| 3,878,636 A | * | 4/1975 | George | 43/43.12 |
| 4,534,127 A | * | 8/1985 | Thorvaldsen | 43/41.2 |
| 5,131,183 A | * | 7/1992 | Thayer et al. | 43/41.2 |
| 5,440,831 A | * | 8/1995 | Chandler | 43/43.11 |

FOREIGN PATENT DOCUMENTS

| | | | | | |
|---|---|---|---|---|---|
| JP | 2003125684 A | * | 5/2003 | | A01K 93/00 |
| JP | 2007089570 A | * | 4/2007 | | A01K 93/00 |

* cited by examiner

*Primary Examiner* — Darren W Ark
(74) *Attorney, Agent, or Firm* — Thomas I. Rozsa

(57) ABSTRACT

A mechanism by which the hook and leader line are released from a casting float enclosure upon its impact with the water so that once the casting float enclosure opens, the leader line with hook and bait go into the water to attract a fish. A mechanism by which in the event the hook or leader line become snagged, the leader line would be lost but the casting float enclosure separately attached to the fishing line will be retrieved. A separating cage with a portion of the casting float to separate the hook and bait form the operating components of the casing float.

10 Claims, 5 Drawing Sheets

CASTING FLOAT WITH A SEPARATION MEMBER TO RETAIN THE CASTING FLOAT IN A PARTIALLY OPENED CONDITION, WHICH ALSO RETAINS A HOOK AND BAIT DURING CASTING AND WHICH FULLY OPENS WHEN THE CASTING FLOAT HITS A BODY OF WATER

BACKGROUND OF THE INVENTION

1. Field of the Invention

The present invention relates to fishing and in particular, to the process of casting a fishing line with bait on a hook. The present invention also relates to the field of floats which retain a portion of the line above water after the float hits the water.

2. Description of the Prior Art

The closest prior art of which the present inventor is aware is the present inventor's own U.S. Pat. No. 3,611,613 issued on Oct. 12, 1971 and entitled "Casting Float For Live Bait" (the "'613 patent").

This '613 patent discloses some of the concepts of the present invention but the present inventor discovered important flaws in his previous invention which impacted the effectiveness of the invention and potential loss of the invention in water. The inventor's prior invention created a possible intermingling of the hook and bait with a portion of an internal float and also has design defects which sometimes caused the bait to become entangled with the internal portion of the float, thereby significantly reducing the ability of the bait to enter the water to attract fish.

In particular, the leader line to which the hook is attached was wrapped around a cylinder within the globe float. As a result, after the float opened by impact of the float on the water, the leader line and hook remained caught within a portion of the float and therefore, the hook and bait thereon was ineffective. In addition, in the previous invention, the fishing line was directly attached to the leader line. The fishing line was heavier and stronger than the leader line. If the hook became tangled in rocks, plants or other objects on a lake bed or sea-floor, the fisherman would pull on the fishing line to extract the hook from where it was entangled or caught. As a result, the leader line which had less strength than the fishing line would break off. Since the leader line was affixed to the casting float, the break-off of the leader line also resulted in the loss of the casting float.

There is a significant need for an improved invention which rectifies the above identified problems with the present inventor's prior invention.

SUMMARY OF THE INVENTION

The present invention is an improvement over the present inventor's prior invention protected by U.S. Pat. No. 3,611,613. The feature that the prior invention and present invention have in common is that they are both enclosed in a globe split into two separate halves which are rotatably attached at one location to enable the halves to split to an opened condition being attached to one another only by the rotatable attaching mechanism (such as rings). An improvement in the present invention is that the globe is forced to be partially open during casting to assure that water will run into the float when it hits the water.

The shape does not have to be a globe but it is an enclosure that has a float on each of the separate halves of the enclosures. In a preferred embodiment, both halves include a flat float and one of the halves also includes a bulbous float.

The two half globe-shaped halves of the enclosure are held together by a dowel affixed to one half of the bulbous float in a second half globe-shaped half which dowel then extends into an opening in a separation member in the first half globe-shaped half which serves to retain the two halves together but also causes the two half globe-shaped halves to be partially opened during casting so the complete globe has an opening at the location where the two halves are adjacent to each other. When the casting float enclosure hits the water after the fishing line is cast, the impact causes the dowel and portion of the bulbous float to which the dowel is attached to become separated from the opening in the separation member so that water runs into the float and the two halves of the enclosure fold open and they then can float in the water which allows the hook and bait to drop into the water.

The major negative of prior fishing apparatus which included a hook onto which bait such as a worm, salmon eggs, a piece of fish or any other conventional bait was affixed, which the present inventor's earlier patent solved, was that after the fisherman attached the bait to a hook, whether the bait was a nightcrawler, salmon eggs, etc., and the fishing line was cast out into the water, the fisherman could not see the end of the attached leader line to which the hook and bait were attached. Because of the force of the casting or when the hook hit the water, many times the bait was released from the hook inadvertently and the bait flew off the hook before it ever hit the water or when it hit the water and consequently the fisherman was unknowingly fishing with a line that had no bait on it.

The improvement of the present inventor's prior patent was that the leader line was wound around a post within the enclosure with the hook and bait inside the enclosure so the enclosure retained the hook and the bait inside the enclosure while the fishing line was flying through the air after being cast from the reel and the enclosure casting float only opened upon impact when the casting float hit the water. Therefore, the fisherman did not run into the problem of the earlier fishing hook and bait arrangements where the bait came loose from the hook. With the present inventor's prior innovation, the bait and hook were retained in the casting float enclosure and the hook and bait were only released when the casting float enclosure hit the water and opened.

The prior invention resolved the problem of the bait inadvertently falling off the hook during casting but it created problems that the prior art did not address. The problems were as follows:

(1) Since the leader line was wound around an internal post, when the casting float enclosure opened upon impact with the water, the hook and bait remained in the enclosure;

(2) The design of the prior invention required the fishing line to be affixed to the leader line. If the enclosure and/or hook became entangled in some way (to a rock, plant, seaweed, kelp, coral, etc.), to free the line, a force from the rod and reel needed to be exerted. Since the fishing line is much heavier and stronger than the leader line, the leader line would break away. The fisherman therefore not only lost the leader line and attached hook and bait, but also lost the casting float enclosure which was attached to the leader line.

The present invention involves the following improvements to address the above described problems with the inventor's prior invention:

(1) One improvement is that the bait and hook to which the bait was attached and a small portion of the leader line attached to the hook, which leader line can be shorter for shallow water (3 to 4 feet) or longer for deeper water (8 to 10 feet) are still in the casting float enclosure but the opposite end of the leader line is attached to an attachment member of the first half globe-shaped half so that a large portion of the leader line extends outside of the casting float enclosure. Therefore, once the casting float enclosure splits open, the hook with the bait and the leader line go outside into the water.

(2) The second innovation which is a significant improvement over the earlier patent of the present inventor is that the end of the fishing line away from the reel is separately attached to the attachment member of the first half of the globe-shaped half. Through this novel separation of the fishing line and leader line, if the hook gets entangled in some seaweed or rocks and it is 10 to 50 feet out, the fisherman cannot see it and after a while the fisherman realizes there is a problem. The way to solve the problem is that the fishing line is typically a heavier 8 or 10 pound test line, while the leader line that is attached to the hook may be 4 to 5 pounds. In this way, the leader line is much lighter than the fishing line so if the hook or any part of the leader line is snagged and is stuck, the fisherman would pull on the fishing line through the rod and reel and the leader line would break off from the attachment member on the first globe-shaped half of the casting float and therefore, the leader line would be lost with the hook and bait but the casting float having the fishing line separately attached to the attachment member would be retrieved and not lost.

(3) A third ancillary improvement is for a second mating half of the half globe-shaped float to contain a bulbous float where the bulbous float is separated into two halves. A first half of the bulbous float is affixed to a hard material blocking wall so that the open end of the first half of the bulbous float faces toward the separation member when the two halves of the globe-shaped casting float are retained together and partially opened. The second half of the bulbous float has an opening to face the fixed first half of the bulbous float to form a complete bulbous float when the two halves come together. The second half of the bulbous float is attached to a dowel. The first semi globe-shaped half of the casting float includes a hard material horizontal wall with multiple openings, which horizontal wall is attached adjacent the top of the blocking wall and attached to a second hard material wall parallel to the blocking wall to create a complete separation cage between the bulbous float and remaining interior of the second semi globe-shaped half of the casting float. The inclusion of a cage comprised of the blocking wall, the horizontal wall, and the second hard material wall at least partially surrounding the bulbous float prevents the bulbous float half and dowel from coming in contact with the bait. The second semi globe-shaped half of the casting float also contains a small vertical stop member with a v-shaped opening located outside of the second hard material wall and horizontal wall and adjacent an interior surface of the second semi globe-shaped half. The first mating half of the semi globe-shaped half of the casting float contains a vertical separation member having an elongated section terminating in a v-shaped tip matching the v-shaped opening in the stop member and also having a transverse opening extending through the elongated section of the separation member. When the first and second semi-globe halves are brought close to each other, the vertical separation member is inserted into the vertical stop member and the dowel is aligned with the transverse opening in the elongated section of the separation member so that the dowel extends through an aligned opening in the second had wall and into and through the opening in the vertical separation member and retains the two semi globe-shaped halves close to each other. The stop member is configured to receive the tip of the elongated section of the separation member and configured to prevent the casting float from entirely closing by leaving a small gap between the two semi globe-shaped halves so that water can rush into the casting float when it hits the water.

It is an object of the present invention to provide a mechanism by which the hook and leader line are released from the casting float enclosure upon its impact with the water so that once the casting float enclosure opens, the leader line with hook and bait go into the water to attract a fish.

It is also an object of the present invention to provide a mechanism by which in the event the hook or leader line become snagged, the leader line would be lost but the casting float enclosure separately attached to the fishing line will be retrieved.

It is additionally an object of the present invention to provide an improved internal structure in the casting float to prevent the hook and bait from coming in contact with the bulbous float and dowel, and a mechanism by which the two mating semi globe halves are retained together to permit water to enter the casting float when it hits the water.

Described in detail, the present invention is a casting float to be used in conjunction with a fishing rod, fishing line, and leader line attached at a proximal end to a fishing hook retaining a bait for fishing for fish in a body of water, the casting float comprising: (a) a mating first semi globe-shaped half and a mating second semi globe-shaped half, the mating first semi globe-shaped half has a circumferential exterior wall with a top surface and an exterior sidewall and an interior sidewall which surrounds an interior chamber with an opening, the exterior and interior sidewalls end in a circumferential rim surrounding an opening leading to the interior chamber; (b) a separation member having an elongated section with a transverse opening extending through the elongated section, a distal end of the elongated section ending in a tip of a "v" shape, at a proximal end, the separation member is attached to a spacer member attached to the interior sidewall so that the separation member is separated from the interior sidewall of the first semi globe-shaped half, the separation member extends vertically away from the top surface and away from the circumferential rim of the mating first semi globe-shaped member, the exterior sidewall also includes a line attachment member extending transversely to and in approximately the same plane as the circumferential rim and having an opening extending through the line attachment member, the interior chamber further includes a first flotation member which is a disc extending from one side of the interior sidewall to an opposite side of the interior sidewall and leaving an air pocket between disc and an upper portion of the interior sidewall; (c) a mating semi globe-shaped second half having a circumferential wall with a top surface, an exterior sidewall and an interior sidewall which surrounds an interior chamber with an opening leading to the interior chamber, the exterior sidewall ends in a circumferential rim surrounding the opening, the interior chamber further includes a second flotation member which is a disc extending from one side of the interior sidewall to an opposite side of the interior sidewall and leaving an air pocket between an upper portion of interior sidewall and the disc; (d) a proximal end of the leader line is attached to the attachment member of the mating first half semi globe-shaped half so that a portion of the leader line extends outside of the casting float during casting and hook and bait and leader line go into the water when the casting float is in the opened condition; (e) a distal end of the fishing line is separately attached to the attachment member of the first half of the globe-shaped half so that the fishing line and leader line are separately attached to the attachment member; (f) the mating second semi globe-shaped half includes a hollow bulbous float where the bulbous float is separated into two halves, a first half of the bulbous float is affixed to a hard material blocking wall so that an open end of the first half of the hollow bulbous float faces toward the separation member when the two halves of the globe-shaped casting float are retained together and partially opened, a second half of the hollow bulbous float has an opening to face the fixed first half of the hollow bulbous float to form a complete bulbous float when the two halves of the hollow bulbous float come together, the second half of the hollow bulbous float is attached to a dowel, the mating second semi-globe-shaped half includes a hard material horizontal wall with a multiplicity of openings which horizontal wall is attached adjacent to a top of the blocking wall and the horizontal wall is attached at its opposite end to a second hard material wall which is parallel to first hard material block wall to create a complete separation cage between the second half of bulbous float and dowel and a remaining interior of the second semi globe-shaped half of the casting float, the cage preventing the second half of the hollow bulbous float half and dowel from coming in contact with the hook and bait retaining in the casting float, the second semi globe-shaped half of the casting float also contains a small vertical stop member with a v-shaped opening located outside of the cage and affixed to the interior surface adjacent the exterior surface of the second semi globe-shaped half, when the first and second semi-globe halves are brought close to each other, the tip of the vertical separation member is inserted into the matching v-shaped top of the vertical stop member and the dowel an a aligned opening in the second hard wall are aligned with the transverse opening in the elongated section of the separation member so that a distal end of the dowel extends into and through the opening in the vertical separation member and retains the two semi globe-shaped halves close to each other, the stop member is configured to receive the tip of the elongated section of the separation member and is sufficiently elevated to prevent the casting float from entirely closing and leaving a gap between the two semi globe-shaped halves so that water can rush into the casting float when it hits the water; and (g) a rotatable connecting mechanism rotatably retains mating first semi globe-shaped half and mating second semi globe-shaped half enclosure together at a location remote from the separation member.

Described more broadly, the present invention is a casting float to be used in conjunction with a fishing rod, fishing line, and leader line attached at a proximal end to a fishing hook retaining a bait for fishing for fish in a body of water, the casting float comprising: (a) a mating hollow first half and a mating hollow second half, the mating hollow first half has an exterior sidewall and an interior sidewall which surrounds an interior chamber with an opening, the exterior and interior sidewalls end in a circumferential rim surrounding an opening leading to the interior chamber; (b) a separation member having an elongated section with a transverse opening extending through the elongated section, a distal end of the elongated section ending in a tip of a given shape, at a proximal end the separation member is attached within the mating hollow first half so that the separation member is separated from the interior sidewall of the mating hollow first half and extends vertically away from the mating hollow first half, the exterior sidewall also includes a line attachment member extending transversely to the exterior sidewall, the interior chamber of the first hollow mating half further includes a first flotation member; (c) the mating hollow second half having an exterior sidewall and an interior sidewall which surrounds an interior chamber with an opening, the exterior and interior sidewalls end in a circumferential rim surrounding an opening leading to the interior chamber, the interior chamber further includes a second flotation member; (d) a proximal end of the leader line is attached to the attachment member of the mating hollow first half so that a portion of the leader line extends outside of the casting float during casting and hook and bait and leader line go into the water when the casting float is in the opened condition; (e) a distal end of the fishing line is separately attached to the attachment member so that the fishing line and leader line are separately attached to the attachment member; (f) the mating hollow second half includes a separation cage having openings therein and surrounding a portion of a hollow float attached to a dowel, the separation cage preventing a portion of the hollow float and dowel from coming in contact with the hook and bait retained in the casting float, the mating hollow second half of the casting float also contains a small vertical stop member with an top opening having a shape to match the given shape of the tip of the separation member, the stop member located outside of the cage and affixed to the interior surface adjacent the exterior surface of the mating hollow second half, when the first and second semi-globe halves are brought close to each other, the tip of the vertical separation member is inserted into the matching shaped opening in the top of the stop member and the dowel is aligned with the transverse opening in the elongated section of the separation member so that a distal end of the dowel extends into and through the opening in the vertical separation member and retains the two hollow mating halves close to each other, the stop member is configured to receive the tip of the elongated section of the separation member and is sufficiently elevated to prevent the two hollow mating halves of the casting float from entirely closing and leaving a gap between them so that water can rush into the casting float when it hits the water; and (g) a rotatable connecting mechanism rotatably retains mating hollow first half mating hollow second half and mating hollow second half together at a location remote from the separation member.

Described even more broadly, the present invention is a casting float comprising: (a) a mating first half enclosure and a mating second half enclosure, the mating first half enclosure having an exterior wall and an interior wall which surrounds an interior chamber, the exterior wall retaining an attaching member to retain a fishing line, the interior chamber further houses a flotation member which enables the mating first half enclosure to remain buoyant and a float on water when the casting float enclosure is open; (b) the mating second half enclosure having an exterior wall and an interior wall which surrounds an interior chamber, the mating second half enclosure having a separating cage to separate the interior chamber into at least two compartments; (c) a rotatable connecting mechanism rotatably connecting the mating first half enclosure and mating second half enclosure together; (d) a separating member in the mating first half enclosure and a flotation member attached to a movable engaging member in the mating second half enclosure extending into the separating member to keep the mating first and second halves together with a gap between the mating first and second halves, the engaging member surrounded by the cage and when the casting float enclosure hits water, the impact of the force of hitting a body of water causes water to rush into the float and the engaging member disengages from the separating member resulting in the first and second mating enclosure members rotating about the rotation member into the opened condition with the casting float enclosure face down in the body of water with the flotation members enabling the two mating enclosure members to float on the water; and (e) a hook which is attached to a distal end of a leader line are within the casting float enclosure in at least one interior chamber and separated from the engaging member by the separation cage, a proximal end of the leader line is separately attached to the attaching member so that the fishing line and leader line are not connected together, and a portion of the leader line extends outwardly from the casting float.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
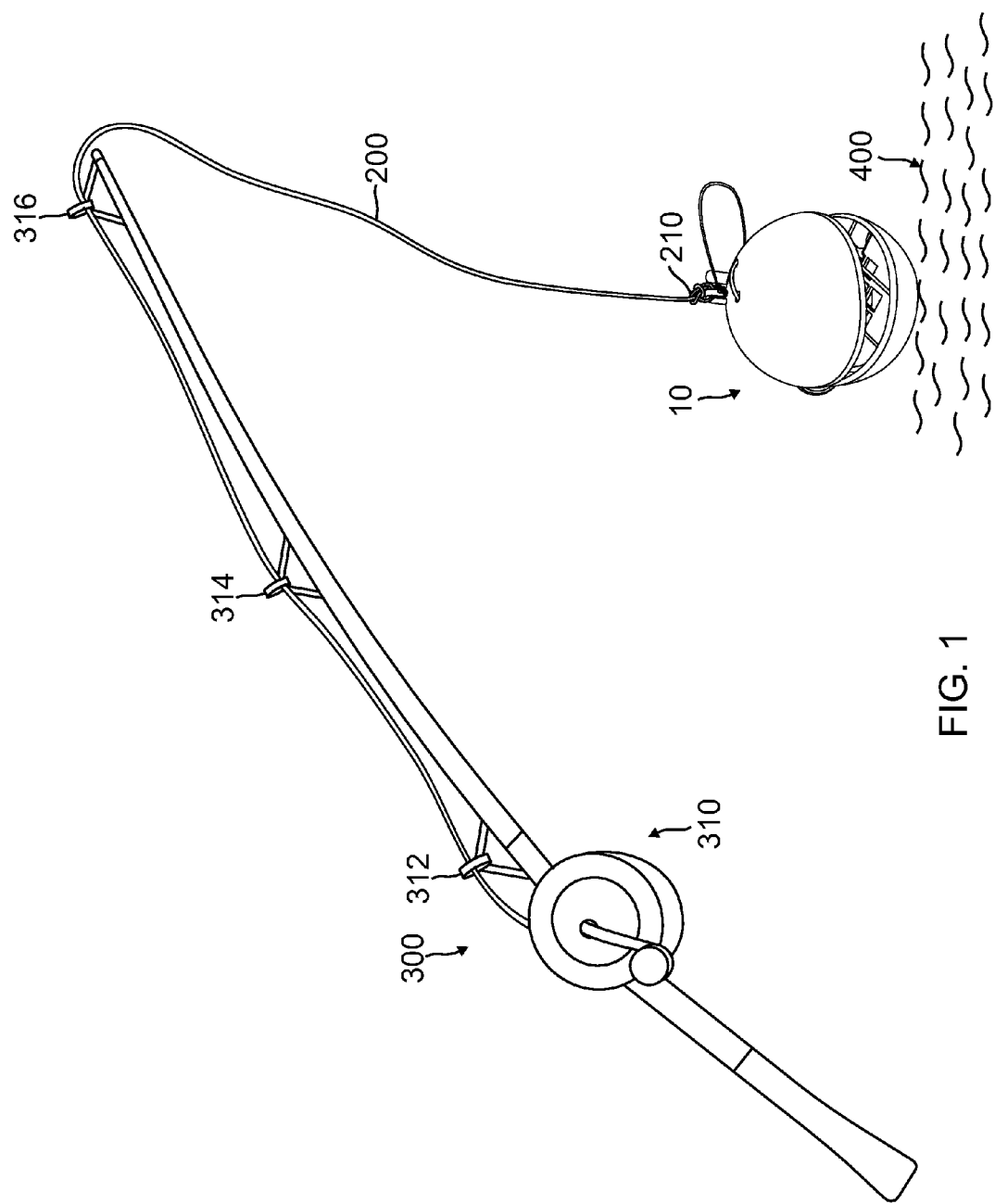
FIG. 1 is a perspective view of a rod, reel, fishing line and the present invention casting float enclosure attached to the distal end to the fishing line.

Referring to FIG. 1, there is illustrated a conventional fishing rod 300 with a reel 310 and spaced apart line rings 312, 314 and 316. A fishing line 200 is wound on reel 310, extends through line rings 312, 314 and 316 and then extends outwardly away from the fishing rod 300. At the distal end 210 of the fishing line 200, the fishing line is attached to a line attachment mechanism (to be discussed in detail later on) of the present invention openable casting float 10.

When a fisherman (not shown) engages in casting the fishing line 200, the line flies through the air and comes down over a body of water 400 which can be a lake, a river, an ocean, etc.

Figure 2:
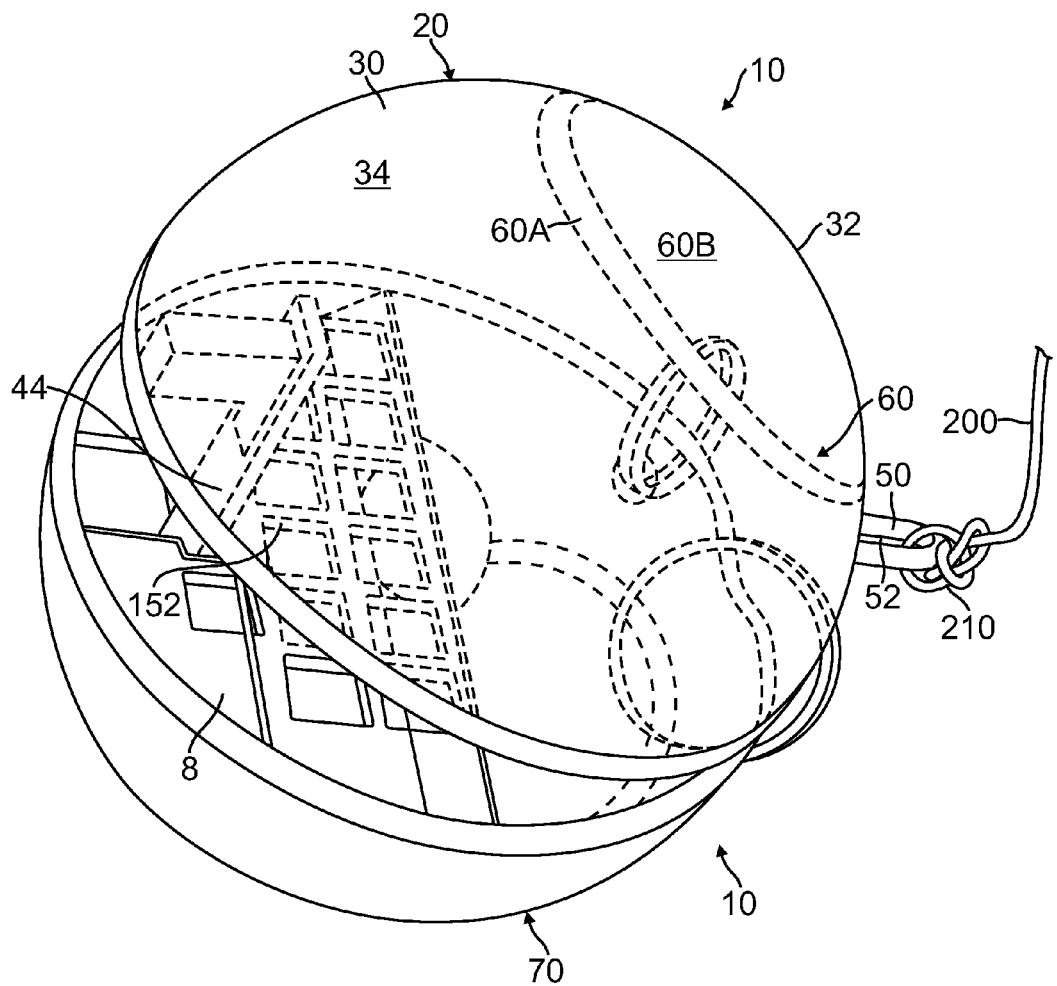
FIG. 2 is a perspective view of the present invention casting float in the partially opened condition with the internal components illustrated in dotted lines.
Figure 3:
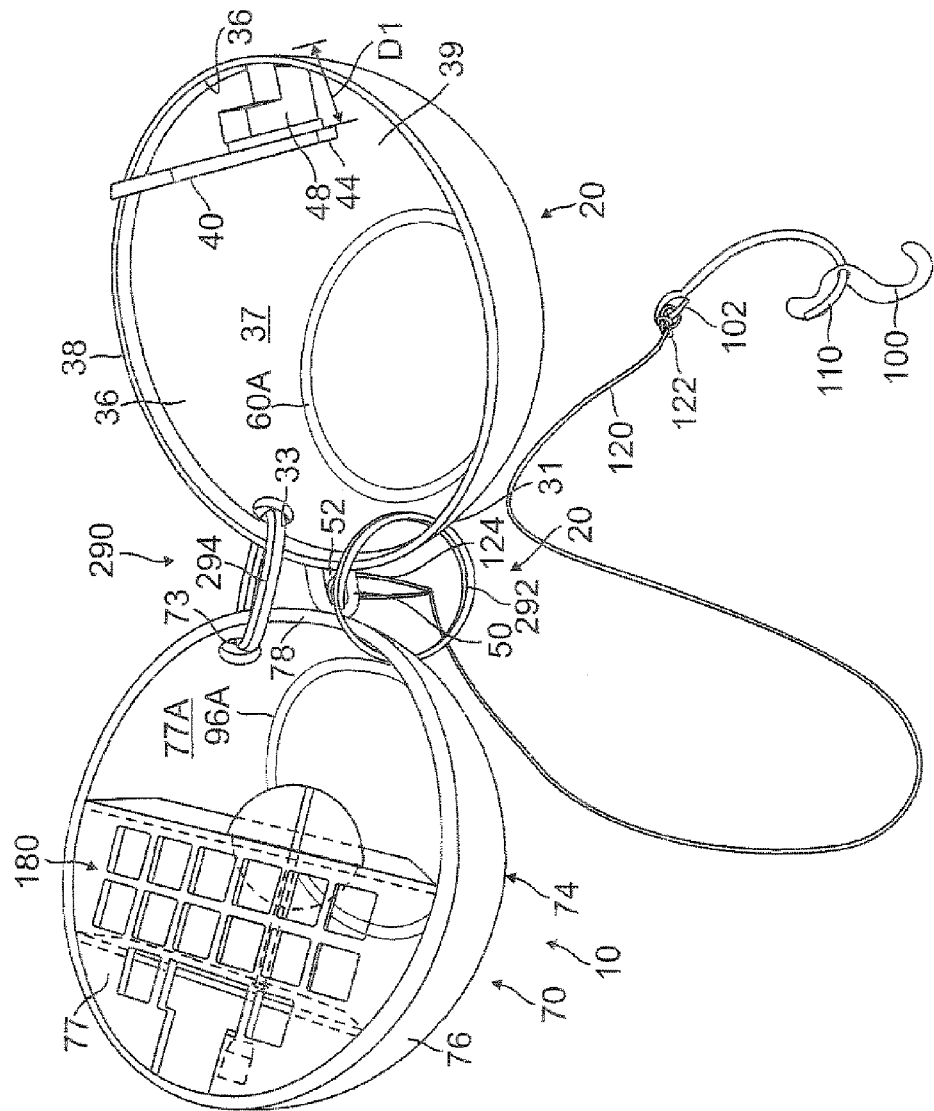
FIG. 3 is an internal perspective view of the present invention casting float in the opened condition.
Figure 4:
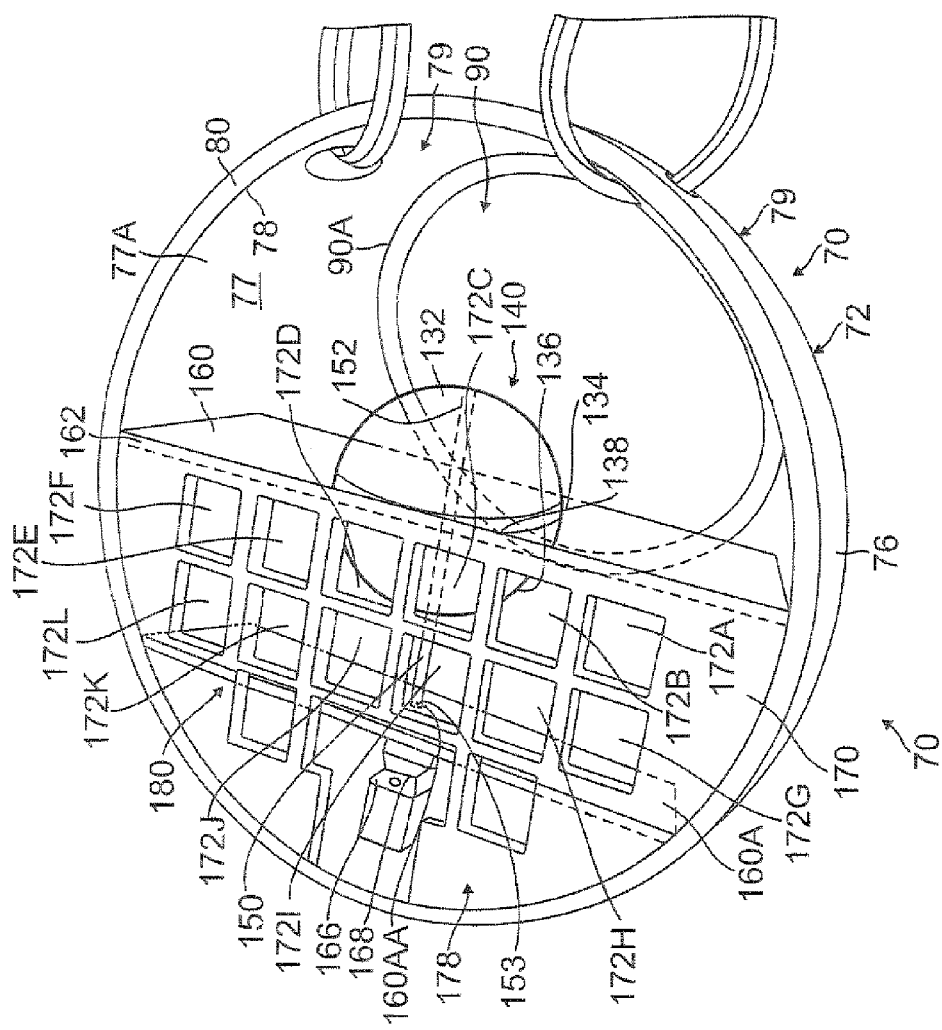
FIG. 4 is an enlarged open perspective view of the second semi globe-shaped half of the casting float illustrating its internal components.
Figure 5:
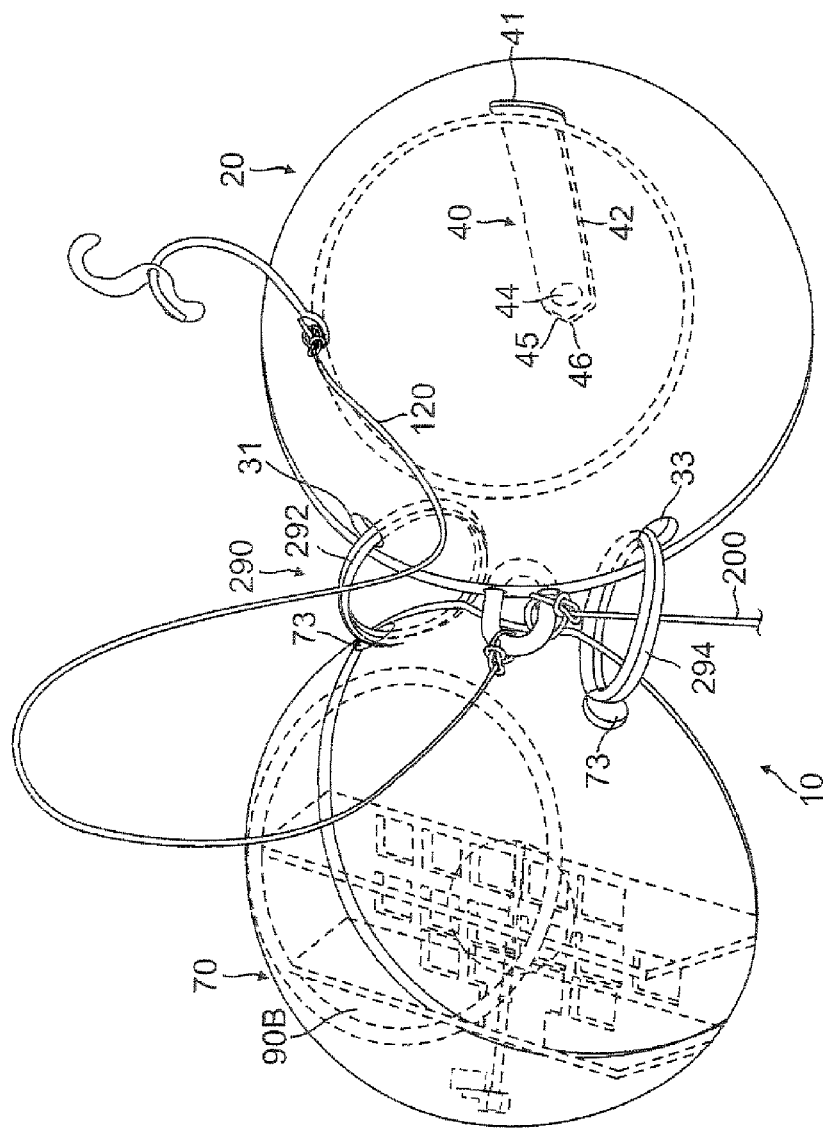
FIG. 5 is an external perspective view of the present invention casting float in the opened condition with the internal components illustrated in dotted lines.

Referring to FIGS. 2 through 5, the present invention casting float 10 is illustrated in the partially closed position in FIG. 2, an interior perspective view of the casting float in FIG. 3, an enlarged interior perspective view of the second semi globe-shaped half of the casting float in FIG. 4, and an exterior perspective view of the casting float in FIG. 5. The casting float 10 comprises a mating first semi globe-shaped half 20 and a mating second semi globe-shaped half 70. The mating first semi globe-shaped half 20 has a circumferential exterior wall 30 with a top surface 32 and an exterior sidewall 34 and an interior sidewall 36 which surround an interior chamber 37 with an opening 39. The sidewall 34 ends in a circumferential rim 38 surrounding opening 39. A separation member 40 has an elongated section 42 with a transverse opening 44 extending through the elongated section 42. The distal end 45 of elongated section 42 ends in a tip 46 having a given shape such as "v"-shaped as illustrated in FIG. 5. At its proximal end 41, the separation member 40 is attached to a spacer member 48, which spacer member 48 is attached to interior sidewall 36 so that the separation member 40 is at a given distance "D1" from the interior sidewall 36. The separation member 40 extends vertically away from top surface 32 and partly away from the circumferential rim 38. The exterior sidewall 36 also includes a line attachment member 50 extending transversely to and in approximately the same plane as the circumferential rim 38 and having an opening 52 extending therethrough. The interior chamber 37 further comprises a first flotation member 60 which by way of example, is a disc 60A leaving air pocket 60B between disc 60A and top surface 32 and an upper portion of interior sidewall 36. The first flotation member 60 enables mating first half enclosure 20 to remain buoyant and afloat on the water 400 when the casting float 10 is open.

In one embodiment, the line attachment member 50 is between retaining rings 292 and 294 of rotatable connecting mechanism 290 discussed below.

The mating second half enclosure 70 has a circumferential wall 72 with a top surface 74, an exterior sidewall 76 and an interior sidewall 78 which surround an interior chamber 77 with an opening 79. The exterior sidewall 76 ends in a circumferential rim 80 surrounding the opening 79. The interior chamber 77 further comprises a second flotation member 90 which by way of example, is a disc 90A leaving air pocket 90B between disc 90A and top surface 74 and an upper portion of interior sidewall 76. The second flotation member 90 enables mating second semi globe-shaped half 70 to remain buoyant and afloat on the water 400 when the casting float 10 is open.

(1) One improvement is that the bait 100 and hook 110 to which the bait 100 is attached and a small portion of the leader line 120 is attached at its distal end 122 to an attaching loop 102 of hook 110, which leader line 120 can be shorter for shallow water (3 to 4 feet) or longer for deeper water (8 to 10 feet) are still in the casting float enclosure 10 but the opposite proximal end 124 of the leader line 120 is attached through opening 52 of attachment member 50 of the first half semi globe-shaped half 20 so that a large portion of the leader line 120 extends outside of the casting float enclosure 10. Therefore, once the casting float 10 splits open, the hook 110 with the bait 100 and the leader line 120 go outside into the water.

(2) The second innovation which is a significant improvement over the earlier patent of the present inventor is that the distal end 210 of the fishing line 200 away from the fishing rod 300 and reel 310 is separately attached through opening 52 of attachment member 50 of the first half of the globe-shaped half 20. Through this novel separation of the leader line 120 and fishing line 200, if the hook 110 gets entangled in some seaweed or rocks and it is 10 to 50 feet out, the fisherman cannot see it and after a while the fishes man realizes there is a problem. The way to solve the problem is that the fishing line 200 is typically a heavier 8 or 10 pound test line, while the leader line 120 that is attached to the hook 110 may be 4 to 5 pounds. In this way, the leader line 120 is much lighter than the fishing line 200 so if the hook 110 or any part of the leader line 120 is snagged and is stuck, the fisherman would pull on the fishing line 200 through the rod 300 and reel 310 and the leader line 120 would break off from the attachment member 50 on the first semi globe-shaped half 20 of the casting float 10 and therefore, the leader line 120 would be lost with the hook 110 and bait 100 but the casting float 10 having the fishing line 200 separately attached to the attachment member 50 would be retrieved and not lost.

(3) A third ancillary improvement is for a second mating half 70 of the half globe-shaped float 10 to contain a bulbous float 140 where the bulbous float 140 is separated into two halves. A first half 132 of the bulbous float 140 is affixed to a hard material blocking wall 160 so that the open end 134 of the first half 132 of the bulbous float 140 faces toward the separation member 40 when the two halves 20 and 70 of the globe-shaped casting float 10 are retained together and partially opened. The second half 136 of the bulbous float 140 has an opening 138 to face the fixed first half 132 of the bulbous float 140 to form a complete bulbous float 140 when the two halves 132 and 136 come together. The second half 136 of the bulbous float 140 is attached to a dowel 150. The second semi-globe-shaped half 70 the casting float 10 includes a hard material horizontal wall 170 with multiple openings 172A, 172B, 172C, 172D, 172E, 172F, 172G, 172H, 172I, 172J, 172K and 172L which horizontal wall 170 is attached adjacent to the top 162 of the blocking wall 160, and attached at its opposite end to a second hard material wall 160A which is parallel to first hard material wall 160 to create a complete separation cage 180 between the second half 136 of bulbous float 140 and dowel 150 and the remaining interior 77A of the second semi globe-shaped half 70 of the casting float 10. The inclusion of a cage 180 comprised of the blocking walls 160 and 160A and the horizontal wall 170 at least partially surrounding the second half 136 of bulbous float 140 and dowel 150 attached to the second half 136 at the dowel's proximal end 152 prevents the bulbous float half 136 and dowel 150 from coming in contact with the bait 100. The second semi globe-shaped half 70 of the casting float 10 also contains a small vertical stop member 166 with a v-shaped opening 168 located outside of the second hard wall 160A and horizontal wall 170 and affixed to the interior surface 78 adjacent the exterior surface 76 of the second semi globe-shaped half 70. The first mating half of the semi globe-shaped half 20 of the casting float 10 contains the vertical separation member 40 having an elongated section 42 terminating in a v-shaped tip 46 matching the v-shaped opening 168 in the stop member 166 and also having a transverse opening 44 extending through the elongated section 42 of the separation member 40. The second hard wall 160A also has an aligned opening 160AA through which the dowel 150 passes. When the first and second semi-globe halves 20 and 70 are brought close to each other, the vertical separation member 40 is inserted into the matching v-shaped top 168 of the vertical stop member 166 and the dowel 150 is aligned with the transverse opening 44 in the elongated section 42 of the separation member 40 so that the distal end 153 of the dowel 150 extends into and through the opening 44 in the vertical separation member 40 and retains the two semi globe-shaped halves 20 and 70 close to each other. The dowel has a proximal end 152. When the float 10 is on land, it is rotated 90 degrees counterclockwise from the position shown in FIG. 1 so that the distal end 153 of the dowel 150 will extend into and through the opening 44 in the vertical separation member 40 by gravity and will remain in that condition until the float hits the water. The vertical stop member 166 is configured to receive the tip 46 of the elongated section 42 of the separation member 40 and is sufficiently elevated to prevent the casting float 10 from entirely closing and leaving a small gap 8 between the two semi globe-shaped halves 20 and 70 so that water 400 can rush into the casting float 10 when it hits the water 400.

Referring to FIG. 5, a rotatable connecting mechanism 290 rotatably retains mating first half enclosure 20 and mating second half enclosure 70 together. One example of a rotatable connecting mechanism 290 is a first ring 292 extending through opening 31 in circumferential walls 34 and 36 and opening 71 in circumferential walls 76 and 78. A second ring 294 extends through opening 33 in circumferential walls 34 and 36 and opening 73 in circumferential walls 76 and 78.

In the semi-closed condition, dowel 150 extends through opening 44 in separation member 44 partially enclosing the casting float 10 to retain the casting float 10 in the semi closed condition as illustrated in FIG. 2. The rings 292 and 294 rotatably retain the two semi globe-shaped halves together. The cage 180 extends across a portion of the interior chamber 77 of second semi globe-shaped half 70 and partially extends across the interior chamber 77 and leaves an unenclosed section 77A into which the bait 100 and hook 110 are retained. The cage 180 prevents the bait 100 and hook 110 from coming in contact with the bulbous float half 136 and dowel 150. When the casting float enclosure 10 hits the water 400, the impact of the force of hitting the water causes the dowel 150 to move away from opening 44 in the separation member 44, resulting in water flowing into the float through gap 8 and openings 172A through 172L in horizontal wall 170 so that the two semi globe-shaped halves 20 and 70 rotating about rotation means such as rings 292 and 294 separate into the opened condition illustrated in FIGS. 3 and 5. The entire casting float 10 and all of its components can be made of material selected from the group consisting of plastic and polyvinyl. The two semi globe-shaped halves 20 and 70 of the casting float 10 are face down in the water as illustrated in FIG. 5, with flotation members 60 and 60A and bulbous float 40 enabling the two halves to float on the water.

Although the preferred embodiment has been described in great detail, it can be more broadly defined. For example, the dowel 150 and separation member 40 can be broadly defined as engaging member as described in the more detailed description of the invention at the end of the Summary section of this patent application. Other features can be also be described in more detail and are not limited to the specific terminology used in the patent application. While described as semi globe-shaped members, each of the halves of the casting float can more broadly be described as hemispherical and also while described as semi spherical as well as semi globe-shaped, it will be appreciated that it is within the spirit and scope of the present invention for the first mating half and a second mating half to be any convenient shape and is not restricted to a semi globe-shape or hemispherical.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:
1. A casting float comprising:
a. a mating first half enclosure and a mating second half enclosure, the mating first half enclosure having an exterior wall and an interior wall which surrounds an interior chamber, the exterior wall including an attaching member to retain a fishing line, the interior chamber further houses a first flotation member which enables the mating first half enclosure to remain buoyant and float on water mating half enclosures are in an opened condition;

b. the mating second half enclosure having an exterior wall and an interior wall which surrounds an interior chamber, the mating second half enclosure having a separating cage to separate the interior chamber into at least two compartments;

c. a rotatable connecting mechanism rotatably connecting the mating first half enclosure and mating second half enclosure together;

d. a separating member in the mating first half enclosure and a second flotation member attached to a movable engaging member in the mating second half enclosure extending into the separating member to keep the mating first half enclosure and the mating second half enclosure together with a gap between the mating first half enclosure and the mating second half enclosure, the engaging member surrounded by the cage and when the casting float hits water, the impact of the force of hitting a body of water causes water to rush into the casting float and the engaging member disengages from the separating member resulting in the mating first half enclosure and the mating second half enclosure rotating about the rotatable connecting mechanism into the opened condition with the mating half enclosures face down in the body of water with the first flotation member in the mating first half enclosure and the second flotation member attached to the movable engaging member in the mating second half enclosure enabling the mating first half enclosure and the mating second half enclosure to float on the water; and e. a hook which is attached to a distal end of a leader line, the hook and the distal end of the leader line both located within the casting float in at least one of the interior chambers of the mating first half enclosure and the mating second half enclosure and separated from the engaging member by the separation cage, a proximal end of the leader line is separately attached to the attaching member so that the fishing line and leader line are not connected together, and a portion of the leader line extends outwardly from the casting float.

2. The casting float in accordance with claim 1, further comprising the hook retaining a bait.

3. The casting float in accordance with claim 1, further comprising:
a. the mating first enclosure being hemispherical; and
b. the mating second enclosure being hemispherical.

4. The casting float in accordance with claim 1, further comprising the casting float being made of plastic.

5. A casting float to be used in conjunction with a fishing rod, fishing line, and leader line attached at a proximal end to a fishing hook retaining a bait for fishing for fish in a body of water, the casting float comprising:

a. a mating hollow first half and a mating hollow second half, the mating hollow first half has an exterior sidewall and an interior sidewall which surrounds an interior chamber with an opening, the exterior and interior sidewalls end in a circumferential rim surrounding the opening leading to the interior chamber;

b. a separation member having an elongated section with a transverse opening extending through the elongated section, a distal end of the elongated section ending in a tip of a given shape, at a proximal end the separation member is attached within the mating hollow first half so that the separation member is separated from the interior sidewall of the mating hollow first half and extends vertically away from the mating hollow first half, the exterior sidewall also includes a line attachment member extending transversely to the exterior sidewall, the interior chamber of the first hollow mating half further includes a first flotation member;

c. the mating hollow second half having an exterior sidewall and an interior sidewall which surrounds an interior chamber with an opening, the exterior and interior sidewalls end in a circumferential rim surrounding the opening leading to the interior chamber, the interior chamber further includes a second flotation member;

d. the mating hollow first half is used in conjunction with the leader line so that a proximal end of the leader line is attached to the attachment member of the mating hollow first half so that a portion of the leader line extends outside of the casting float during casting and the hook and bait and leader line go into the water when the casting float is in the opened condition;

e. the mating hollow first half is also used in conjunction with the fishing line so that a distal end of the fishing line is separately attached to the attachment member so that the fishing line and leader line are separately attached to the attachment member;

f. the mating hollow second half includes a separation cage having openings therein and surrounding a portion of a hollow float attached to a dowel, the separation cage preventing a portion of the hollow float and dowel from coming in contact with the hook and bait retained in the casting float, the mating hollow second half of the casting float also contains a small vertical stop member with a top opening having a shape to match the given shape of the tip of the separation member, the stop member located outside of the cage and affixed to the interior sidewall adjacent the exterior sidewall of the mating hollow second half, when the first and second mating halves are brought close to each other, the tip of the separation member is inserted into the top opening in a top of the stop member and the dowel is aligned with the transverse opening in the elongated section of the separation member so that a distal end of the dowel extends into and through the opening in the separation member and retains the first and second hollow mating halves close to each other, the stop member is configured to receive the tip of the elongated section of the separation member and is sufficiently elevated to prevent the first and second hollow mating halves of the casting float from entirely closing and leaving a gap between them so that water can rush into the casting float when it hits the water; and g. a rotatable connecting mechanism rotatably retains the mating hollow first half and mating hollow second half together at a location remote from the separation member.

6. The casting float in accordance with claim 5, further comprising:
a. the rotatable connecting mechanism includes a first ring extending through a first opening through the interior and exterior sidewalls of the mating hollow first half and an aligned first opening through the interior and exterior sidewalls of the second hollow mating half; and
b. a spaced apart second ring extending through a spaced apart second opening through the interior and exterior sidewalls of the mating hollow first half and an aligned second opening through the interior and exterior sidewalls of the mating hollow second half.

7. The casting float in accordance with claim 5, further comprising:
the casting float being made of plastic.

8. A casting float to be used in conjunction with a fishing rod, fishing line, and leader line attached at a proximal end to a fishing hook retaining a bait for fishing for fish in a body of water, the casting float comprising:

a. a mating first semi globe-shaped half and a mating second semi globe-shaped half, the mating first semi globe-shaped half has a circumferential exterior wall with a top surface and an exterior sidewall and an interior sidewall which surrounds an interior chamber with an opening, the exterior and interior sidewalls end in a circumferential rim surrounding the opening leading to the interior chamber;

b. a separation member having an elongated section with a transverse opening extending through the elongated section, a distal end of the elongated section ending in a tip of a "v" shape, at a proximal end, the separation member is attached to a spacer member attached to the interior sidewall so that the separation member is separated from the interior sidewall of the first semi globe-shaped half, the separation member extends away from the interior sidewall and away from the circumferential rim of the mating first semi globe-shaped member half, the exterior sidewall also includes a line attachment member extending transversely to the exterior sidewall and in approximately the same plane as the circumferential rim and having an opening extending through the line attachment member, the interior chamber further includes a first flotation member which is a disc extending from one side of the interior sidewall to an opposite side of the interior sidewall and leaving an air pocket between the disc and an upper portion of the interior sidewall;

c. the mating second semi globe-shaped half having a circumferential wall with a top surface, an exterior sidewall and an interior sidewall which surrounds an interior chamber with an opening leading to the interior chamber, the exterior sidewall ends in a circumferential rim surrounding the opening, the interior chamber further includes a second flotation member which is a disc extending from one side of the interior sidewall to an opposite side of the interior sidewall and leaving an air pocket between an upper portion of the interior sidewall and the disc;

d. the mating first half of the semi globe-shaped half is used in conjunction with the leader line by having the proximal end of the leader line is attached to the attachment member of the mating first half semi globe-shaped half so that a portion of the leader line extends outside of the casting float during casting and the hook and bait and the leader line go into the water when the casting float is in an opened condition;

e. the mating first semi globe-shaped half is used in conjunction with the fishing line by having a distal end of the fishing line is separately attached to the attachment member of the first semi globe-shaped half so that the fishing line and leader line are separately attached to the attachment member;

f. the mating second semi globe-shaped half includes a hollow bulbous float where the bulbous float is separated into two halves, a first half of the bulbous float is affixed to a first hard material blocking wall so that an open end of the first half of the hollow bulbous float faces toward the separation member when the first and second mating halves of the casting float are retained together and partially opened, a second half of the hollow bulbous float has an opening to face the fixed first half of the hollow bulbous float to form a complete bulbous float when the first and second halves of the hollow bulbous float come together, the second half of the hollow bulbous float is attached to a dowel, the mating second semi-globe-shaped half includes a first hard material horizontal wall with a multiplicity of openings which first hard material horizontal wall is attached along one side thereof adjacent to a top of the first hard material blocking wall and the first hard material horizontal wall is attached at an opposite side thereof adjacent to a top of a second hard material blocking wall which is parallel to the first hard material blocking wall to create a complete separation cage between the second half of the bulbous float and dowel and a remaining interior of the second semi globe-shaped half of the casting float, the cage preventing the second half of the hollow bulbous float and dowel from coming in contact with the hook and bait retained in the casting float, the second semi globe-shaped half of the casting float also contains a small vertical stop member with a v-shaped opening located outside of the cage and affixed to the interior sidewall adjacent the exterior sidewall of the second semi globe-shaped half, when the first and second semi-globe halves are brought close to each other, the tip of the separation member is inserted into the v-shaped opening of the vertical stop member and the dowel is aligned with an opening in the second hard material blocking wall and is also aligned with the transverse opening in the elongated section of the separation member so that a distal end of the dowel extends into and through the opening in the separation member and retains the first and second semi globe-shaped halves close to each other, the stop member is configured to receive the tip of the elongated section of the separation member and is sufficiently elevated to prevent the casting float from entirely closing and leaving a gap between the first and second semi globe-shaped halves so that water can rush into the casting float when it hits the water; and g. a rotatable connecting mechanism rotatably retains mating first semi globe-shaped half and mating second semi globe-shaped half together at a location remote from the separation member.

9. The casting float in accordance with claim 8, further comprising:

a. the rotatable connecting mechanism includes a first ring extending through a first opening through the interior and exterior sidewalls of the first semi globe-shaped half and an aligned first opening through the interior and exterior sidewalls of the second semi globe-shaped half; and b. a spaced apart second ring extending through a spaced apart second opening through the interior and exterior sidewalls of the first semi globe-shaped half and an aligned second opening through the interior and exterior sidewalls of the second semi globe-shaped half.

10. The casting float in accordance with claim 8, further comprising:

the casting float being made out of hard plastic.

\* \* \* \* \*